US007753083B2

(12) United States Patent
Kern et al.

(10) Patent No.: US 7,753,083 B2
(45) Date of Patent: Jul. 13, 2010

(54) METHOD FOR PRODUCING CONNECTING ENDS ON METAL HOSES AND HOSE PIECE COMPRISING SUCH CONNECTING ENDS

(75) Inventors: Edward Kern, Oakwood, GA (US); Marc Pontzen, Speyer (DE); Stephen Goley, Canton, GA (US)

(73) Assignee: BOA Balg- und Kompensatoren-Technologie GmbH, Stutensee (DE)

( * ) Notice: Subject to any disclaimer, the term of this patent is extended or adjusted under 35 U.S.C. 154(b) by 1155 days.

(21) Appl. No.: 11/357,007

(22) Filed: Feb. 21, 2006

(65) Prior Publication Data

US 2006/0138196 A1 Jun. 29, 2006

Related U.S. Application Data

(62) Division of application No. 10/934,417, filed on Sep. 7, 2004, now Pat. No. 7,111,770.

(30) Foreign Application Priority Data

Sep. 12, 2003 (DE) ................................ 103 42 353

(51) Int. Cl.
*F16L 11/00* (2006.01)

(52) U.S. Cl. .................... 138/109; 138/177; 285/288.1; 219/121.63

(58) Field of Classification Search ................. 138/109, 138/177, 137; 228/17, 30, 38, 235.2; 285/194.1, 285/294.2, 288.1
See application file for complete search history.

(56) References Cited

U.S. PATENT DOCUMENTS

| | | | | |
|---|---|---|---|---|
| 4,694,137 | A * | 9/1987 | Hawkins et al. | 219/121.63 |
| 5,986,236 | A * | 11/1999 | Gainand et al. | 219/121.82 |
| 6,060,682 | A * | 5/2000 | Westbroek et al. | 219/121.64 |
| 6,380,509 | B1 * | 4/2002 | Arlt | 219/121.63 |

* cited by examiner

*Primary Examiner*—Patrick F Brinson
(74) *Attorney, Agent, or Firm*—Paul Vincent

(57) ABSTRACT

Connecting ends on a hose piece comprising several metal layers, in particular a strip wound metal hose piece, are produced by fixing the overlapping metal layers of a hose of larger length or of an endless hose in the region of the point of separation through welding and subsequently cutting off the hose piece from the longer hose or the endless hose. For simple and inexpensive fixing of the metal layers in the region of the point of separation, a welding seam is generated which extends through at least part of the periphery of the hose or about its entire periphery, using roller seam welding. The hose piece can subsequently be separated along the welding seam obtained in this manner, e.g. along its central line, thereby ensuring permanent and reliable fixing of the metal layers in the region of the connecting end.

7 Claims, 2 Drawing Sheets

7
10
8
9

METHOD FOR PRODUCING CONNECTING ENDS ON METAL HOSES AND HOSE PIECE COMPRISING SUCH CONNECTING ENDS

This application is a divisional of Ser. No. 10/934,417 filed on Sep. 7, 2004 now U.S. Pat. No. 7,111,770 and also claims Paris Convention priority of DE 103 42 353.2 filed Sep. 12, 2003 the complete disclosures of which are hereby incorporated by reference.

BACKGROUND OF THE INVENTION

The invention concerns a method for producing connecting ends on a hose piece having several metal layers, in particular, a strip wound metal hose piece, by fixing the overlapping metal layers of a hose having a larger length or of an endless hose in the region of the point of separation through welding to subsequently separate the hose piece from the longer hose or the endless hose. The invention also concerns a hose piece, in particular, a strip wound metal hose piece which comprises several metal layers and at least one connecting end in the region of which at least regions of the overlapping metal layers are welded together.

Hoses of this type comprising overlapping metal layers are used, in particular in the form of annular or helically strip wound hoses, as conduit elements in exhaust pipes of automotive vehicles. Due to their above-mentioned construction, they can accommodate certain length variations, as well as the bending and twisting which usually occur during operation of automotive vehicles, e.g. due to thermal expansion or vibration.

These conduit elements are manufactured, in particular, through helical winding of one or more layers of a metal strip. The positive connection of the neighboring regions of the strip or layers is effected through U-shaped profiles or folds. The production lines for such hoses are either endless or produce at least hose sections having a length of several meters.

For further processing, the strip wound hoses must be cut to a desired length. This separating process may not be effected by merely cutting perpendicularly to the hose axis, since fixation of neighboring layers would be partially destroyed and the strip end would burst open due to its internal tension leading to sharp tips or triangular protrusions at the strip end. Should a hose piece have such burst-open connecting ends, it cannot be further processed and must be rejected. Later fixing of the burst-opened metal layers in the region of the burst-open connecting ends is, in particular, not possible in practice, since the metal layers are exposed to bending loads.

In order to fix the connecting ends before separating off a hose piece from the longer hose or from an endless hose, the metal layers of the hose are conventionally fixed only mechanically in the region of the connecting ends (EP 1 281 904 A2). This may be effected through pressing, embossing, imprinting etc., of at least regions thereof. This requires, however, relatively expensive tools which must also be adapted to the respective hose geometry. Moreover, permanent fixing of the metal layers which would allow, in particular, later widening of the hose piece in the region of the connecting ends as is required for adjustment to the pipe diameter of neighboring pipe elements, is not possible in practice.

DE 44 11 246 A1 and EP 0 674 964 A1 describe a method for producing connecting ends on metal hoses of the above-mentioned type by laser welding a large number of welding points in the form of a stitch seam to fix the metal layers of an endless hose in the region of the subsequently produced connecting ends. Subsequent separation of the hose piece is effected by laser beam cutting.

One disadvantage is the substantial splashing during the required point welding of very oily and coated metal strips which can soil the processing optics and gas conduits. Moreover, two neighboring approximately parallel stitch seams or, at considerably reduced speed, one stitched seam must be produced, having a relatively large welding point diameter. This process is time consuming and therefore expensive. If the welding points have similar separations, there is always the fundamental risk that small residual triangular protrusions or nubs are formed after subsequent cutting off of the hose piece. The welded stitch seam at the terminating end of the strip wound hose tends to tear during a subsequent widening or calibration process leading to incomplete fixation in the region of the connecting ends. This can produce rejects, or at least considerably aggravate handling of such a hose piece. Subsequent widening or calibrating processes often produce breaks at the welded stitch seams in the longitudinal direction of the hose piece, which may extend over one or even more windings of the metal layers of the hose.

DE 198 51 173 C1 discloses a further method and a device for producing connecting ends on metal hoses of the above-mentioned type. The metal layers of the hose are also fixed by laser welding before the separating process, wherein a laser beam is guided continuously over the entire periphery of the hose piece thereby superposing a cyclic motion which subtends a finite angle with respect to the peripheral direction of the hose piece to produce the welding seam and generate an approximately sinusoidal or saw-tooth-shaped welding seam. This permits more effective and faster fixing of the metal layers in the region of the connecting ends of the hose piece and effectively prevents extensive splashing which occurs, in particular, during point welding. It however, also bears the danger that one or more metal layers are torn in the region of the connecting ends, in particular, during later widening or calibration processes of a hose piece produced in this manner.

It is therefore the underlying purpose of the invention to provide a simple and inexpensive method of the above-mentioned type which eliminates the described disadvantages and permits, in particular, perfect and load-resistant connection of the metal layers of the produced hose piece in the region of the connecting ends. The invention also concerns a hose piece produced in this manner.

SUMMARY OF THE INVENTION

A process control object is achieved in accordance with the invention with a method of the above-mentioned type in that for fixing the metal layers in the region of the point of separation, at least one welding seam, which extends at least about part of the periphery of the hose, is fixed through roller seam welding.

The term "roller seam welding" used throughout the specification and claims refers to a weld seam produced in the following manner. Welding electrodes are constructed in the form of cylinders or rollers between which the workpieces to be welded are moved over at least part of the periphery of the metal layers of a hose section or endless hose which is to be subsequently cut. A welding seam of a relatively large width can thereby be generated. The seam width can be defined by the width of the roller-shaped welding electrodes. In the inventive roller seam welding, the metal layers of the hose are welded together in a peripheral surface region extending through the gap between the roller-shaped welding electrodes, with a pressing force being exerted on each of the rollers in a direction approximately normal to the hose. The welding current can be controlled in a conventional manner e.g. through corresponding setting of the pulse widths. The advance of the hose in the peripheral direction thereof may be effected through a rotational motion of the hose itself and/or via the rotational speed of the roller-shaped welding electrodes, which rotate in opposite directions.

The invention provides, in particular for strip wound hoses, woven hoses and also extruded knitted hoses, chemical bonding connection, preferably throughout a surface region of radially superposed parts or portions of a hose which are already partially positively connected.

Undefined overlappings of the layers of such hoses (in particular up to 4 non-uniformly oriented layers) are thereby prevented.

The inventive method permits extremely rapid and effective welding of the hose in the region of its connecting ends. In a preferred embodiment, a welding seam which extends along the entire periphery of the hose is provided by roller seam welding to fix the metal layers in the separation region. Only one single welding seam is therefore sufficient for fixing the metal layers of the hose around the entire periphery and may have a considerably larger width than a welding seam produced through laser welding as defined by the width of the roller-shaped welding electrodes. The seam can withstand large loads, in particular, in the axial and also radial directions of the hose.

Cutting of the hose piece from the correspondingly pretreated hose of larger length or endless hose can be effected in a simple manner through separation in the region of the welding seam produced through roller seam welding, wherein the welded metal layers of the hose piece are reliably and permanently fixed in the region of the connecting ends thereby safely preventing tearing of the hose piece in the region of the connecting ends. This is also true, in particular, in the event of subsequent widening or calibration processes, wherein relatively large widening of the connecting ends is possible without requiring annealing processes which are necessary in accordance with prior art in order to reverse the strain hardening produced during manufacture of the endless hose. The continuous connection of the metal layers of the hose about the entire periphery using roller seam welding moreover ensures uniform and regular connection of the individual layers throughout the entire, relatively wide connecting region of the layers such that a later widening or calibration process provides uniform distribution of loads with, in particular, the elimination of load peaks which occur substantially in punctiform or linear laser welding processes. The thermal influence zone of the welding seam thereby extends over the entire width thereof and around the periphery of the hose such that an annealed structure is produced in this region which is favorable for subsequent widening of the hose piece in the region of the connecting ends, while avoiding the need for a separate annealing process. Finally, residual lubricants which could be produced during manufacture of the hose and which could otherwise cause disturbances when welding the hose piece to an exhaust pipe e.g. of an automotive vehicle, are eliminated by the roller seam welding process.

The width of the welding seam is preferably between approximately 2 mm and 12 mm, in particular, between approximately 3 mm and 8 mm. The welding seam is thereby sufficiently wide to provide simple separation of a hose piece in the region of the welding seam while assuring permanent connection of the metal layers of the separated hose piece in the region of its connecting ends.

In accordance with the inventive method, the welding seam extends about the entire hose periphery or even only part thereof and can be disposed in a plane substantially perpendicular to the longitudinal central axis of the hose or in a plane which is inclined with respect to the longitudinal central axis of the hose to obtain either a hose piece having a perpendicular or inclined connecting end or having one perpendicular and one inclined connecting end, if required.

It is moreover suitable to separate the hose piece from the longer hose or the endless hose after disposing the welding seam substantially along the central line of the welding seam which extends in the peripheral direction of the hose, or at least in the vicinity thereof, such that the hose pieces obtained from an endless hose have corresponding connecting ends.

The hose piece can be separated from the longer hose or the endless hose directly after roller seam welding and in the same operating cycle. Alternatively, the hose piece can be separated from the longer hose or the endless hose after the welding seam has been completed, in particular about the entire periphery of the hose. In the first method, the roller-shaped welding electrodes can be provided with a downstream separating means e.g. in the form of a mechanical cutting means, a laser beam cutting means or the like to cut the hose piece directly after roller seam welding of the metal layers thereof.

The hose piece can be cut from the longer hose or the endless hose in the region of the welding seam in any conventional manner. In accordance with a preferred embodiment, the hose piece is separated using beam separation processes such as laser, plasma, water jet separation or the like. In another preferred embodiment, the hose piece is mechanically separated from the longer hose or the endless hose, e.g. through cutting, melting separation or the like.

The invention also concerns a hose piece, in particular a strip wound metal hose piece which comprises several metal layers and at least one connecting end in the region of which at least regions of the overlapping metal layers are welded together. To solve the underlying problem of the invention, the metal layers of such a hose piece are roller seam welded together in the region of the connecting end over at least part of the periphery of the hose piece. The metal layers are thereby roller seam welded together throughout a surface area region. The metal layers of the hose piece may thereby be continuously roller seam welded to each other, preferably in the region of the connecting end and throughout the entire periphery of the hose piece. Such a hose piece provides optimum durability in the region of its connecting ends. In particular, the formation of cracks in the region of its connecting ends is reliably prevented.

The width of the welding seam in the region of the connecting end is preferably between approximately 1 mm and 6 mm, between approximately 1.5 mm and 4 mm, or approximately half the width of the endless hose roller seam welding.

As mentioned above, the connecting end of the hose piece may extend in a plane which is oriented substantially perpendicular to the longitudinal central axis of the hose piece or in a plane which is inclined thereto.

In a preferred embodiment, both connecting ends of the hose piece are formed with metal layers which are roller seam welded together over at least part of the periphery of the hose piece.

The invention is explained in more detail below using an embodiment with reference to the drawings.

DESCRIPTION OF THE PREFERRED EMBODIMENT

Figure 1:
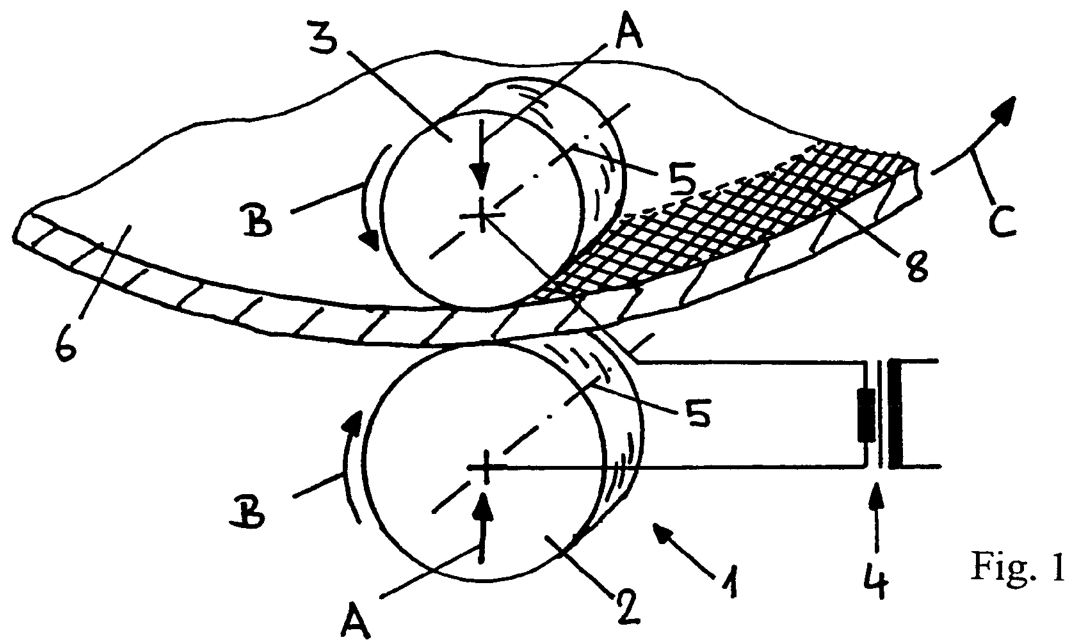
FIG. 1 shows a schematic view of a strip wound metal hose (broken away) during roller seam welding of its metal layers.

FIG. 1 shows a schematic view of a roller seam welding device 1. The device 1 comprises two welding electrodes 2, 3 which are designed as cylinders or rollers and are each loaded with an electric voltage using a welding transformer 4. The welding electrodes 2, 3 are disposed at a mutual separation, and the workpieces which are to be welded together are introduced into the gap provided between the electrodes 2, 3. The electrodes 2, 3 can be loaded in a normal direction with respect to each other (see arrows A) to provide the pressing force required during the welding process. The electrodes 2, 3, which are designed as rollers, are rotatably disposed on their longitudinal central axis 5 and can rotate opposite to each other in the direction of the arrows B. The width of the welding electrodes 2, 3 and of the welding seam which can be produced thereby is e.g. approximately 6 mm.

In the situation shown in FIG. 1, a metal hose 6 comprising several metal layers which are in mutual positive engagement with another is inserted between the welding electrodes 2, 3, wherein the electrode 2 is disposed on the outer side and the electrode 3 is disposed on the inner side of the hose 6. To generate a welding seam which extends about the entire periphery of the hose 6, the hose 6 is rotated along its longitudinal central axis 7 (FIG. 2) in the direction of the arrow C, thereby obtaining a welding seam 8 (shown in hatched lines) whose width corresponds to the width of the inserted roller-shaped welding electrodes 2, 3. The electrodes 2, 3 are thereby mutually prestressed in the direction of arrows A and rotated in the direction of arrows B.

Alternatively, the hose 6 may be held stationary and the electrode arrangement 2, 3 may be moved around the periphery of the hose 6. The metal layers of the hose 6 are thereby permanently connected to each other in the region of the welding seam 8 throughout a surface area region.

Figure 2:
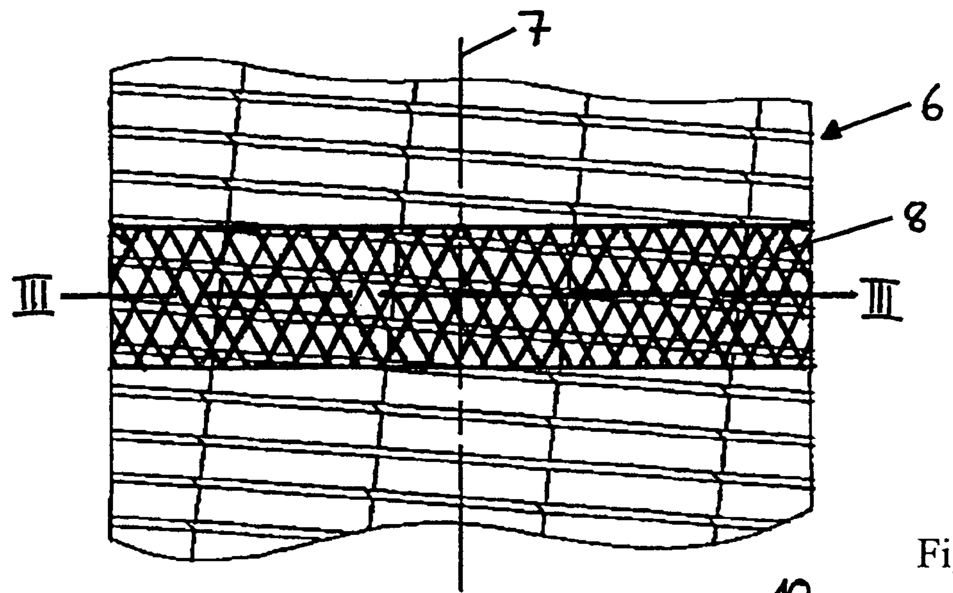
FIG. 2 shows a top view onto a strip wound metal hose (broken away) in the region of its roller seam welding.

FIG. 2 shows a top view onto the hose 6 in accordance with FIG. 1 which was provided with a welding seam 8 extending around the entire periphery of the strip wound metal hose 6 and, in the present embodiment, substantially perpendicularly to the longitudinal central axis 7. For cutting a hose piece 9 (FIG. 3) from the hose 6 in accordance with FIG. 2, the hose piece 6 is cut in a central region of the welding seam 8, in the present case along its central line III-III, in any conventional manner e.g. using laser beams.

Figure 3:
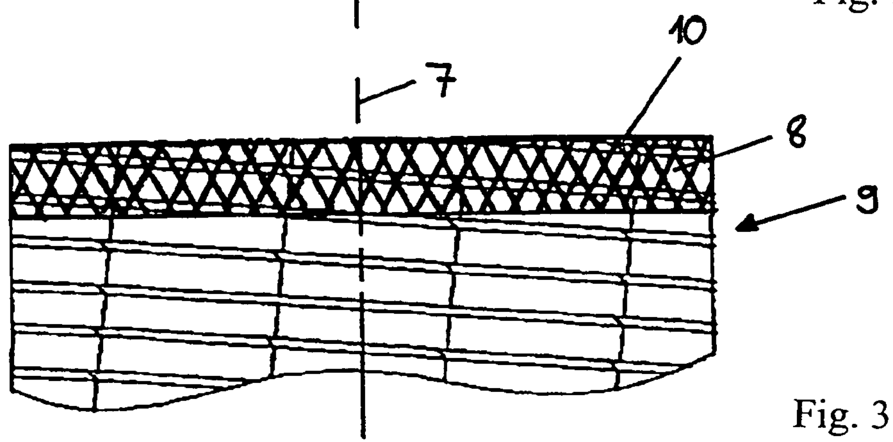
FIG. 3 shows a connecting end (broken away) of a hose piece obtained through separating the hose piece in accordance with FIG. 2 along the line III-III.

The hose piece 9 of FIG. 3 obtained in this manner has a connecting end 10 whose meal layers are joined to each other in the region of the welding seam 8 in a permanent and reliable manner. The width of this region corresponds to approximately half the width of the welding seam 8 disposed on the hose 6 in accordance with FIG. 2, wherein the width of the welding seam 8 may e.g. be approximately 6 mm and the width of the end-side region of the hose piece 9 where the metal layers of the hose are connected may consequently be approximately 3 mm.

The surface connection of the metal layers in the region of the connecting end 10 of the hose piece 9 obtained through roller seam welding facilitates, in particular, further processing thereof, wherein e.g. widening or calibration processes may be performed without the danger that the hose piece 9 is torn in the region of its connecting end 10. The opposite connecting end of the hose piece 9 which is not shown in FIG. 3 may have a corresponding design.

Figure 4:
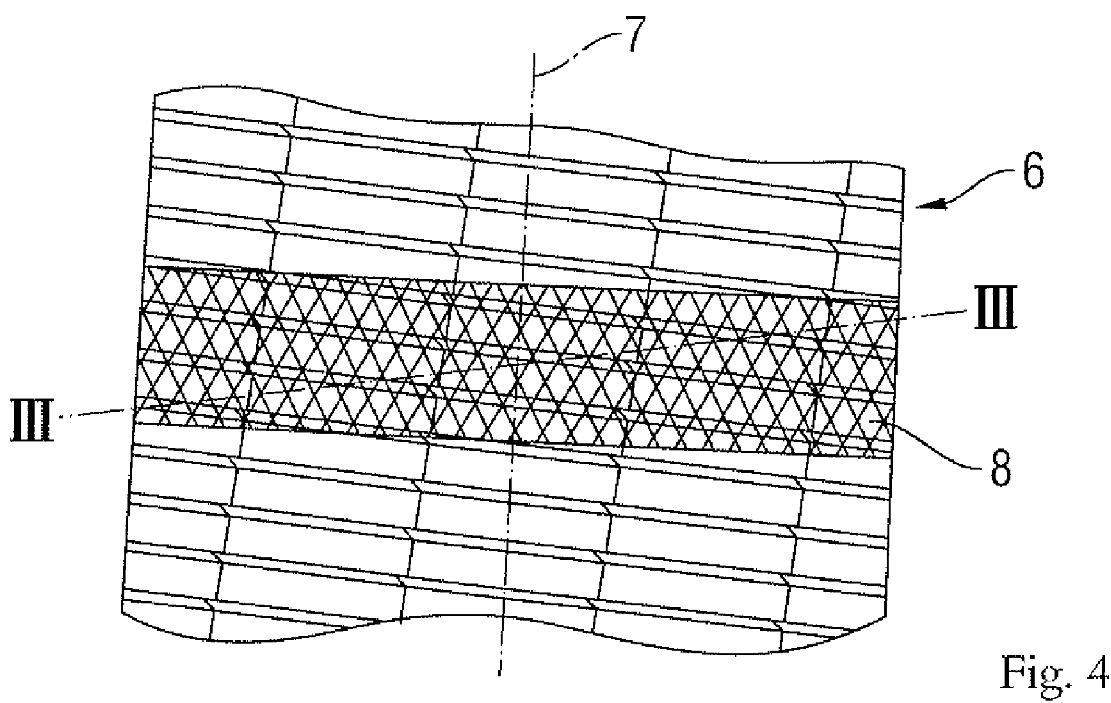
FIG. 4 shows a hose cut to produce an inclined end.

FIG. 4 shows a hose 6 with which a first connecting end is generated at cut line III-III within welding seam 8. The end thereby extends in a plane which is inclined relative to a longitudinal central axis 7 of the hose piece.

We claim:

1. A hose piece having several metal layers in mutual positive engagement with another, the hose piece being separated from a hose of larger length or an endless hose, the hose piece comprising:

a roller welding seam to fix radially superposed metal layers of the hose at a separation region, said welding seam extending around at least a portion of a periphery of the hose within a plane which is substantially perpendicular to an axial extension of the hose, wherein the hose piece is cut from the hose of larger length within an axial width of said welding seam to produce a first connecting end which remains within said welding seam throughout an entire periphery thereof.

2. The hose piece of claim 1, wherein said metal layers are continuously roller seam welded together in a region of said first connecting end over an entire periphery of the hose piece.

3. The hose piece of claim 2, wherein said welding seam has a width in a region of said first connecting end of between 1 mm and 6 mm.

4. The hose piece of claim 3, wherein said width is between 1.5 mm and 4 mm.

5. The hose piece of claim 1, wherein said first connecting end extends in a plane which is oriented substantially perpendicular to a longitudinal central axis of the hose piece.

6. The hose piece of claim 1, wherein said first connecting end extends in a plane which is inclined relative to a longitudinal central axis of the hose piece.

7. The hose piece of claim 1, further comprising a second connecting end, said connecting end structured with characteristics defining said first connecting end in response to roller seam welding of said second connecting end.

* * * * *